No. 719,256. PATENTED JAN. 27, 1903.
J. QUERN.
CAR FENDER.
APPLICATION FILED OCT. 28, 1902.
NO MODEL.
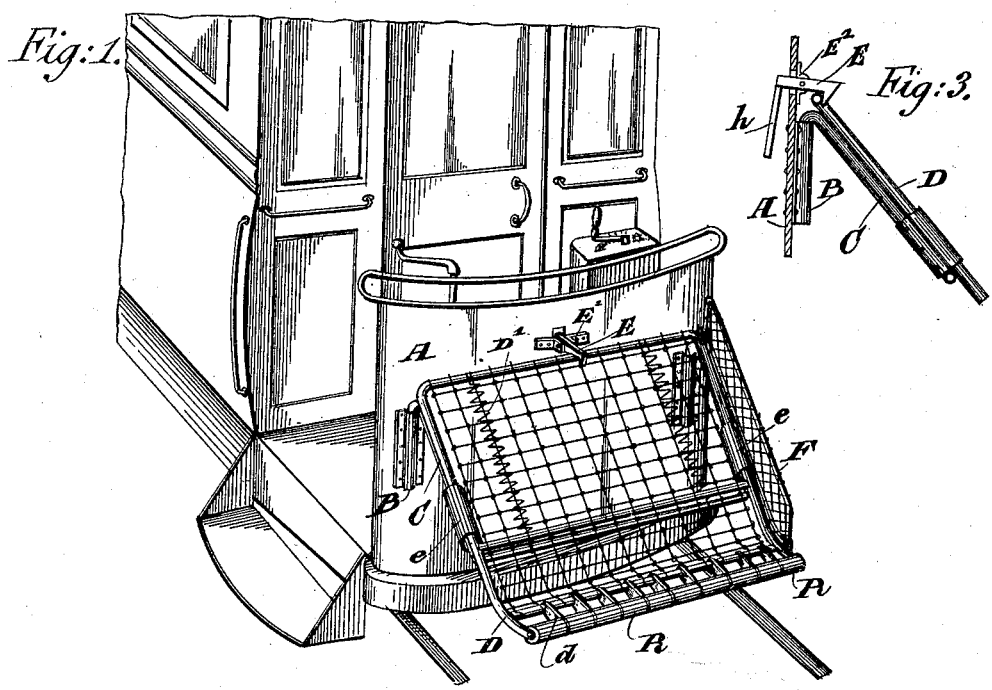
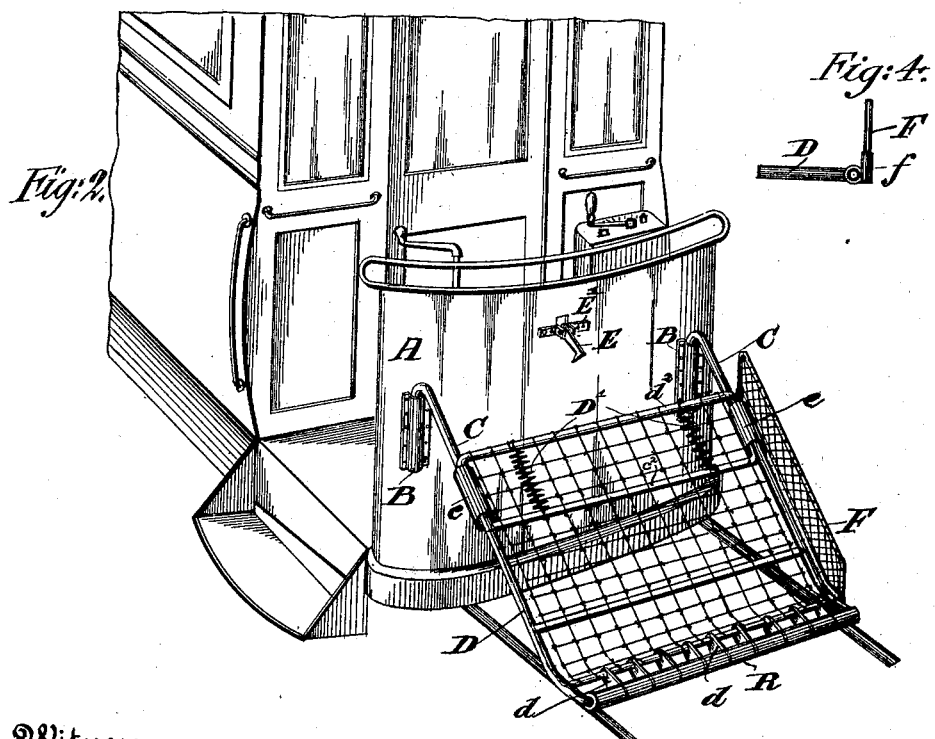
Witnesses
C. P. Goepel
Henry J. Suhrbier
Inventor
John Quern
By his Attorneys
Jaquex Viles

UNITED STATES PATENT OFFICE.

JOHN QUERN, OF BROOKLYN, NEW YORK.

CAR-FENDER.

SPECIFICATION forming part of Letters Patent No. 719,256, dated January 27, 1903.

Application filed October 28, 1902. Serial No. 129,077. (No model.)

*To all whom it may concern:*

Be it known that I, JOHN QUERN, a citizen of the United States, residing in New York, borough of Brooklyn, and State of New York, have invented certain new and useful Improvements in Car-Fenders, of which the following is a specification.

This invention relates to an improved car-fender of that class which is intended to be used for electric trolley-cars and which is so constructed that it can be transferred bodily from one end of the car to the other, according to the direction in which the car is moving, and which can instantly be lowered toward the track at the will of the motorman, so as to scoop up any person on the track or throw them sidewise off the track, so as to be out of danger; and for this purpose the invention consists of a car-fender which is supported in sockets attached to the dashboard of the car, said fender consisting of a stationary frame provided with bent-down or hook-shaped ends fitted into the sockets and of a sliding and spring-actuated frame guided on the main frame and provided with a roller at its lower front end and a hook for engaging the sliding and spring-actuated section of the fender for locking the same when in raised position and for permitting the releasing of the sliding and spring-actuated section of the fender by the motorman instantly in case of danger, so that the sliding frame is moved in downward direction, together with the main frame, into contact with the track for scooping up any obstruction on the same.

The invention consists, further, of an auxiliary frame arranged at one side of the sliding and spring-actuated fender-section and of certain additional details of construction, which will be fully described hereinafter and finally pointed out in the claims.

In the accompanying drawings, Figures 1 and 2 represent perspective views of my improved car-fender, showing the same, respectively, in raised and lowered positions. Fig. 3 is a detail section of the locking device of the fender; and Fig. 4 is a detail of the sliding fender, showing the relative arrangement of the auxiliary side fender on the same.

Similar letters of reference indicate corresponding parts.

Referring to the drawings, A represents the dashboard of a car, which is provided with sockets B, one at each side of the same, in which my improved fender is supported. The fender consists of two sections, a main section, preferably made of piping of approximately U shape and arranged at a downward angle of inclination to the dashboard, the sides of the main section being provided at the upper ends with downwardly-bent or hook-shaped ends which are inserted in the sockets B on the dashboard A, and a second section D, which is guided in stationary sleeves $e$ on the sides of the main section C, as shown clearly in Figs. 1 and 2.

The frame of the sliding and spring-actuated fender-section is wired by suitable wire-netting and provided at the lower end with a roller R, which is made in sections and connected to the lower end of the sliding fender-section D by links $d$, as shown clearly in Figs. 1 and 2, so that when the sliding fender-section moves over the track the individual sections of the roller will turn on their axis and permit the easy gliding of the lower fender-section on the track or road-bed.

The upper transverse portion of the sliding fender-section D is connected with the transverse lower portion of the main section by means of strong helical springs D', which are attached to the transverse portions $d^2 c^2$ of the sliding and main sections D and C, said springs setting the sliding frame to tension when the same is raised in the guide-sleeves on the main section, so as to be engaged by a locking-lever E, which is fulcrumed to a lug E' on the front of the dashboard, as shown in Fig. 1, said hook being provided with a lever-handle $h$, which passes through an opening in the dashboard to the inside, so as to be in position for being readily manipulated by the motorman. When the sliding fender-section is taken hold of at its upper cross-bar $d^2$ and moved against the tension of its springs toward the dashboard, the hook or locking-lever E will drop by gravity over the cross-bar $d^2$ of the sliding fender-section and lock the same in position, (shown in Figs. 1 and 3,) the springs being thereby set to tension and the roller at the lower end of the sliding section being sufficiently above the track, so as not to interfere with the same, permitting thereby the free motion of the car. In case of danger to a person or other obstruction on the track the motorman releases the locking-lever E from the sliding fender-section by pressing the lever-handle h, so that the sliding section is immediately by the tension of its springs moved along the main section C in downward direction, so that the roller comes in contact with the track and scoops up any obstruction in the way, so as to prevent it from getting under the wheels of the car. In some cases, however, the motorman has not time enough to lower the sliding fender-section, in which case the lower end of the fender-section strikes the leg of the person and scoops him up on the fender. Fatal accidents, such as those caused by the car passing over the person, may thereby be obviated.

The auxiliary guard F is arranged at the inner side of the sliding fender-section D, so that a person or other obstruction scooped up by the fender is prevented from being rolled over it onto the adjacent track. This auxiliary guard is arranged at right angles to the sliding fender-section D and is supported in sockets f on said fender-section, as shown in Fig. 4.

When the car arrives at the end of the track, the fender is bodily moved by taking hold of the main frame and carried over to the other end of the car. Here it is lowered into similar sockets of the dashboard, as at the opposite end of the car, and the sliding fender-section is locked in its upper inclined position by the latch E. When it is necessary to lower the sliding fender-section, the motorman releases the latch with his hand or knee, so as to release the sliding and spring-actuated fender-section and lower it sufficiently to scoop up any obstruction, so as to prevent accident. The springs serve also for cushioning the fender-section when in lowermost position, so as to deaden the force of the blow on the person or obstruction.

Having thus described my invention, I claim as new and desire to secure by Letters Patent—

1. The combination, with the dashboard of a trolley or other car provided with a socket at each side of the same, of a main frame provided with downwardly-bent ends or hooks at its upper end for insertion into said sockets, a sliding and spring-actuated fender-section guided on the main section, and a locking-latch for locking or releasing the sliding fender-section, the locking-latch being located on the dashboard and operated by the motorman, substantially as set forth.

2. The combination, with the dashboard of a trolley or other car provided with sockets near the sides of the dashboard, of a downwardly-inclined main section provided with downwardly-bent upper ends for insertion into the sockets, guide-sleeves on the main section, a sliding and spring-actuated fender-section guided in said sleeves and provided with rollers at its lower end, and a locking-latch for locking and releasing the spring-actuated fender-section by the motorman, substantially as set forth.

3. The combination, with the dashboard of a trolley or other car provided with sockets near the sides of the dashboard, of a downwardly-inclined main section provided with downwardly-bent upper ends for insertion into the sockets, guide-sleeves on the main section, a sliding and spring-actuated fender-section guided in said sleeves and provided with rollers at its lower end, a locking-latch for locking and releasing the spring-actuated fender-section by the motorman, and an auxiliary fender-guard at the inner side of the sliding fender-section, substantially as set forth.

In testimony that I claim the foregoing as my invention I have signed my name in presence of two subscribing witnesses.

JOHN QUERN.

Witnesses:
PAUL GOEPEL,
C. P. GOEPEL.